May 10, 1960 F. SCHOPPE 2,935,840
FLUID MIXING CHAMBER
Filed Feb. 26, 1954 4 Sheets-Sheet 2
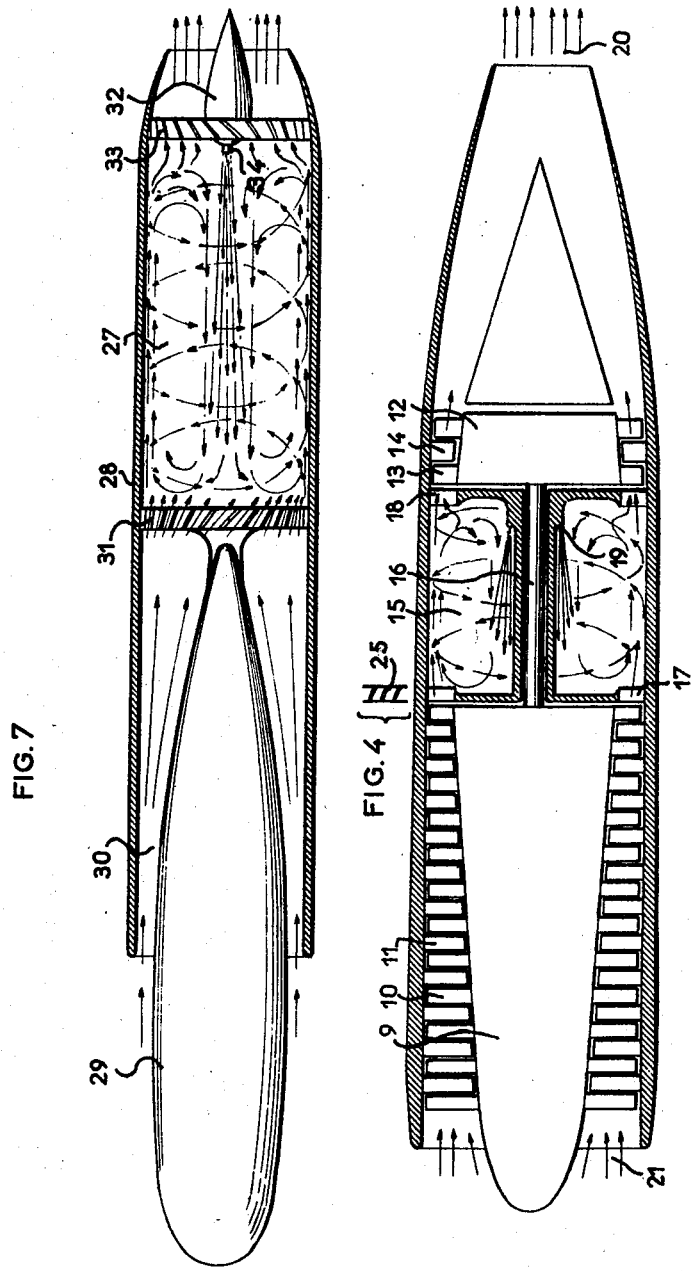
Inventor
Fritz Schoppe
by Brown + Newark
Attorneys May 10, 1960 F. SCHOPPE 2,935,840
FLUID MIXING CHAMBER
Filed Feb. 26, 1954 4 Sheets-Sheet 3
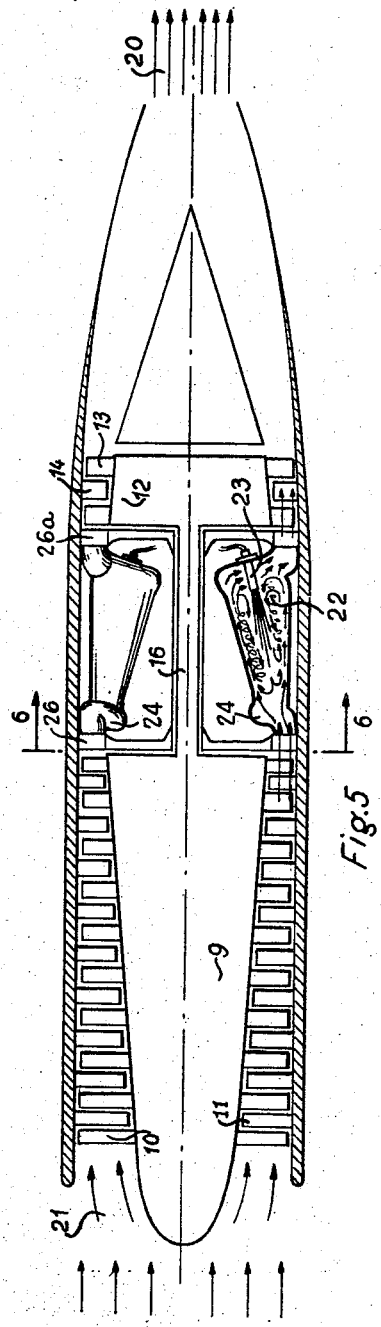
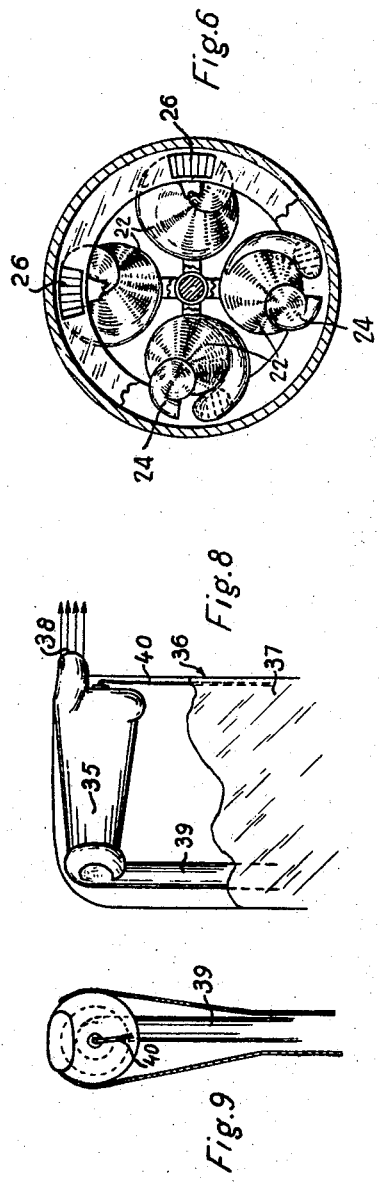
Inventor
Fritz Schoppe
by Brown & Seward
Attorneys

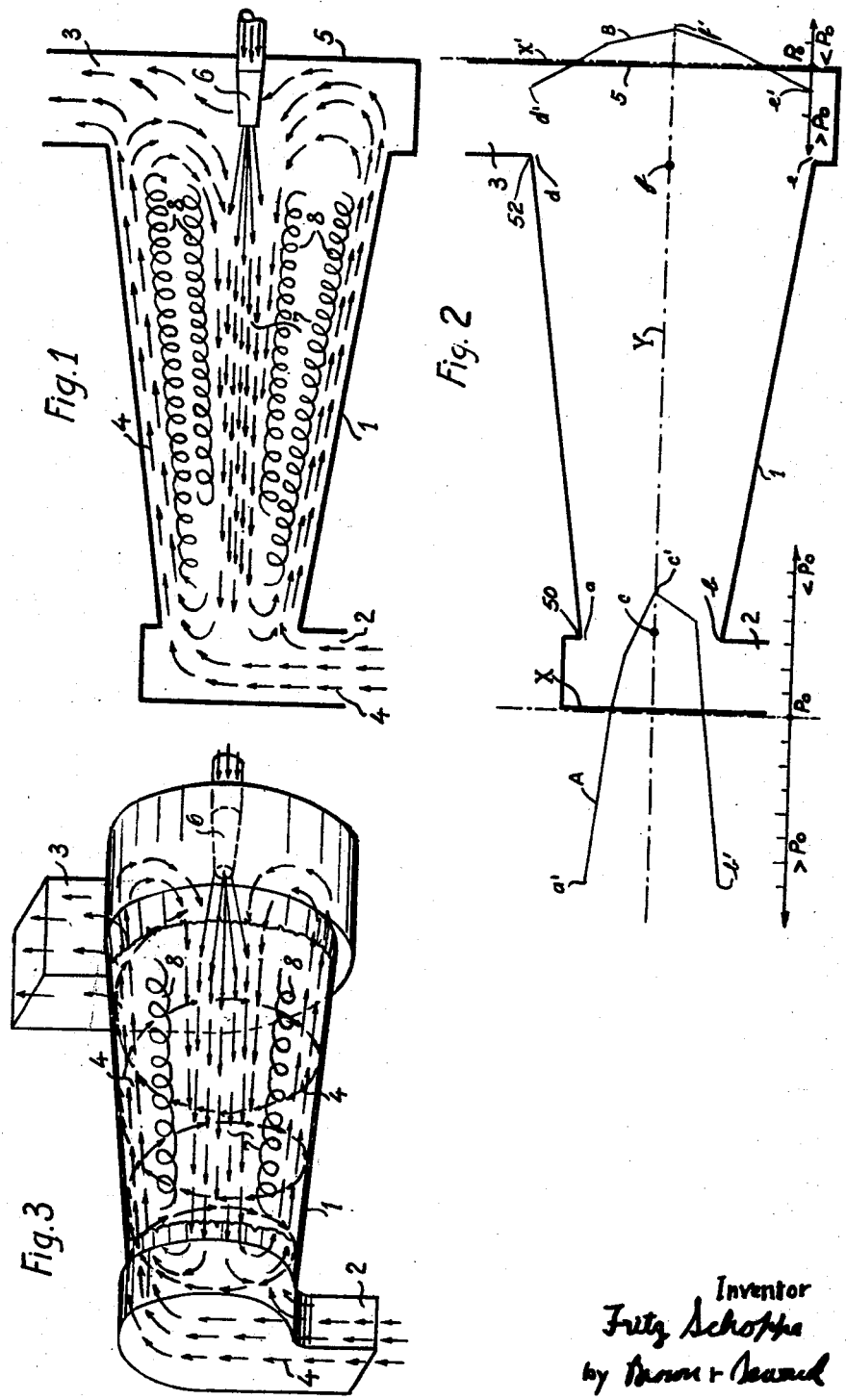

United States Patent Office 2,935,840
Patented May 10, 1960

2,935,840
FLUID MIXING CHAMBER

Fritz Schoppe, Munich-Pasing, Germany, assignor to Metallbau Semler G.m.b.H., Munich, Germany, a German company Application February 26, 1954, Serial No. 412,859

Claims priority, application Germany February 26, 1953

17 Claims. (Cl. 60—35.6)

This invention relates to method and apparatus for mixing fluids. Such method and apparatus, which involve a mixing chamber, can be utilized in many mixing applications and is hereinafter particularly described related to use in combined mixing and combustion in which a continuous flow of a first medium, e.g., combustive, is mixed with at least a second medium, e.g., combustible, whereupon the mixture, e.g., burnt gases, is permitted to escape in a continuous flow from said chamber.

To obtain a thorough mixing in such a mixing chamber, it is indispensable that some kind of turbulence be created in the fluid within the chamber. For example, in previously known combustion chambers, turbulence in the fluid is conventionally created by one or more obstacles, either rigid or constituted by jets of an auxiliary fluid. These obstacles have the inherent drawback of creating one or more zones of "dead water" and, hence, a considerable loss of energy. The term "dead water" is known to designate a fluid which is not in proper circulation, and as used herein applies to a fluid which is not in proper circulation in a mixing chamber.

Specific described applications of the invention herein disclosed apply to combustion chambers. Major problems of combustion-chamber design are (1) proper mixing of the gases; (2) flame stabilization; (3) clean combustion; (4) elimination of pulsations and noise; (5) reduction of pressure loss; and (6) maintenance of steady controlled fuel flow. Gas velocities in the combustion zone of previously known combustion chambers have been reported as high as 400 feet per second, but they are commonly held to 150 to 250 feet per second or below.

This invention used in conjunction with a combustion chamber substantially reduces the noise level and effectively reduces and in some instances eliminates the aforenoted problems.

This invention encompasses a method by which, and a mixing chamber in which, required turbulence for mixing is obtained without any obstacle of any kind in the inner space of the mixing chamber. A completely different type of turbulent flow which occurs between parallel streams of fluid is accomplished by, and utilized in, this invention. This turbulent flow, for purposes of this application, can be termed the Schlichting-Lessen or S-L type flow, and is discussed and computed theoretically in N.A.C.A. Report 979 published in 1950 and entitled "On Stability of Free Laminar Boundary Layer Between Parallel Streams" by Martin Lessen. Although the S-L type of turbulence and various of its characteristics have been described and computed theoretically by Lessen, it has never, prior to this invention, been intentionally created by man. For counterflowing parallel fluid streams, Lessen has calculated theoretical flow stability and instability characteristics.

The present invention accomplished the S-L type turbulence, previously known only in theory and possibly in nature, between parallel streams of fluid within a tubular chamber. The method of producing these parallel streams, interacting in the required manner, consists of the introduction of a fluid medium (in this application the term "fluid" is intended to include liquids, gases and pulverulents and combinations thereof) into the chamber approximate one end in such a manner as to create a pressure distribution at the inlet end which has a high pressure adjacent the tubular wall and a low pressure adjacent the axis of the tubular chamber. This fluid moves toward the other end and as the fluid stream progresses to the other end the pressure gradient profile flattens. The flatter pressure gradient approximate the other end results in a low pressure at the axis of the tubular chamber which nevertheless is higher than the pressure at the axis of the first end, and this resultant pressure differential causes a backflow in the nature of a counterflow along the axis of the chamber from the other end to the first end. The outer zone of fluid and counterflowing inner zone of fluid provide substantially parallel fluid streams. Interaction between the counterflowing inner and outer zones, when the Reynolds number parameter exceeds the minimum required to obtain the S-L type of turbulence, gives rise to an annular zone, between the inner and outer zones, of continuously violent turbulence extending lengthwise along the chamber. Additional fluid media can be also introduced into the chamber. This method and practical structural applications by which the resultant mixing action can be used are described hereinafter in the detailed description portion of this application.

Because of the inherent characteristics of the S-L type of turbulent flow it will occur between parallel streams even at an infinite Reynolds number whereas flow past an obstacle (Blasius type of flow) is stable beyond a finite range of Reynolds numbers (i.e., mixing becomes impossible in a mixing chamber, and in a combustion chamber burning cannot be maintained with Blasius type flow above a certain Reynolds number). Because previously known combustion chambers have depended upon the Blasius type flow and turbulence resulting therefrom, the upper limit of air flow in the chambers known prior to this invention was the aforenoted 400 feet per second and, as this speed was so close to stable flow (with no turbulence), designers were restricted to input airflow values well below 400 feet per second. A combustion chamber utilizing the present invention has no known upper speed limit of input air flow because an excellent unstable flow (with violent turbulence) can be maintained up to values approaching infinite Reynolds number. The fluids are always completely mixed in the floating turbulent zone between the high speed practically parallel streams of fluid. In combustion chambers the floating positive occurrence of the turbulent mixing ensures an even, annular flame stabilization at all input airflow speeds excepting those of very low Reynolds numbers, somewhere below 50. Also in a combustion chamber this complete mixing process and stabilization of flame results in clean complete combustion. There is no problem with pressure losses because requisite operating pressures are self-induced by action of the input airflow as it passes into and along the combustion chamber. In this chamber although pressure changes are necessary for operation the pressure loss is low and is only a fraction of the pressure losses which occur in previously known combustion chambers and other turbulent mixing chambers. Maintenance of steady, closely controlled fuel flow, while still desirable in order to maintain turbine blade temperature limits and combustion loads for desired output, for instance, is no longer a critical problem insofar as combustion chamber walls are concerned because there is no difficulty with high burning temperatures destroying chamber walls. In other words, the outer zone of high speed fluid maintains the chamber walls sufficiently cool that there is no danger of melting the chamber walls even if common sheet metal walls are used. Because of the even, coherent and annular turbulent zone, pulsations are eliminated and noise is substantially reduced.

Accordingly a primary object of this invention resides in providing a novel method of bringing about turbulence between parallel or approximately parallel fluid flow paths.

Another object resides in providing a novel method of creating a relatively stationary annular elongate zone of violent turbulence at the boundary zone between two concentric, annular, elongate counterflowing fluid streams.

Still another object resides in providing a novel method of creating a turbulent zone of fluid between two approximately parallel fluid flow streams by creating a spiral fluid flow, confining the spiral flow to a fixed tubular path, and at a distance down the path enabling a reversal in the form of an inflow becoming a counterflow of some of the fluid along the axis on the innerside of the spiral outer flow.

A further primary object resides in the provisions of a novel mixing chamber in which a relatively stationary confined zone of turbulence is obtained through the interaction of approximately parallel opposite flow paths created in the chamber.

A still further object resides in the provision of a novel tubular mixing chamber in which an annular intermediate zone of turbulence is obtained between inner and outer coaxial zones of counterflowing high speed fluid flow streams by introducing and creating a spiralling input of fluid into one end of the mixing chamber and directed toward the other end and such a chamber can be provided with a device for introducing a second fluid into the chamber, the resulting mixture escaping from one end of the chamber.

A further object resides in the provision of a novel tubular mixing chamber of cylindrical or frusto-conical shape, having one end no larger than the other end, in which an annular turbulent zone of fluid is provided between two concentric zones of counterflowing fluid streams within the cylindrical chamber obtained by inlet structure adjacent the one end of the chamber for introducing a fluid into the chamber in a manner causing spiralling of the fluid in a tubular path from the one end to the other end of the chamber, patterns within the chamber providing an inflow of fluid at the other end of the chamber and a reversal of fluid flow along the axial core of the chamber from the other end to the one end.

Another object of the invention resides in the provision of a mixing chamber of the type described, in which at least one of the media to be mixed enters at one end, while the mixture escapes at the other end.

Still a further object of the invention resides in the provision of a novel combustion chamber through which the combustive medium passes in a continuous flow, as described above, and in which a combustible medium is injected as near as possible along the axis of the chamber in the direction of the axial counterflow and, preferably, in the vicinity of the outlet end.

Another object of my invention resides in the provision of a turbo-jet engine comprising, in combination, at least one compressor, at least one combustion chamber of the type described and at least one turbine, said turbine driving said compressor, while the same feeds said chamber or chambers with compressed combustion supporting air in a substantially helical flow, the burned gases acting on said turbine, the rotation of which permits recovering the rotational component of said burned gases, whereby the same are ejected with a substantially rectilinear motion, fuel being injected in said chamber or chambers near the axial zone of the same.

A still further object of my invention resides in the provision of a ram-jet engine comprising a combustion chamber, as described above, fed with air from outside through a suitable passage as well as with fuel; the burned gases which escape from said chamber constituting the jet of the engine.

Further novel features and other objects of this invention will become apparent from the following detailed description, discussion and the appended claims taken in conjunction with the accompanying drawings, showing preferred structures and embodiments, in which:

Figure 1 is a longitudinal sectional view of a mixing chamber according to the invention;

Figure 2 is a diagrammatic showing of the distribution of pressures in said chamber;

Figure 3 is a perspective view of said chamber;

Figure 4 is a longitudinal sectional view of a turbo-jet engine provided with an annular combustion chamber according to the invention;

Figure 5 is a part sectional view of another turbine-jet engine provided with a plurality of combustion chambers of the types of Figures 1 to 3 angularly spaced around the axis of the engine;

Figure 6 is a cross-sectional view along line 6—6 of Figure 5;

Figure 7 is a longitudinal sectional view of a ram-jet provided with a combustion chamber according to the invention;

Figure 7b is a cross section view of the straightener vanes taken on line 7b—7b of Figure 7a;

Figure 8 is a diagrammatic view of a helicopter blade of which the tip is provided with an individual combustion chamber according to the invention; and Figure 9 is an end view of the trailing edge of the helicopter blade illustrated in Figure 8.

Figure 6A:
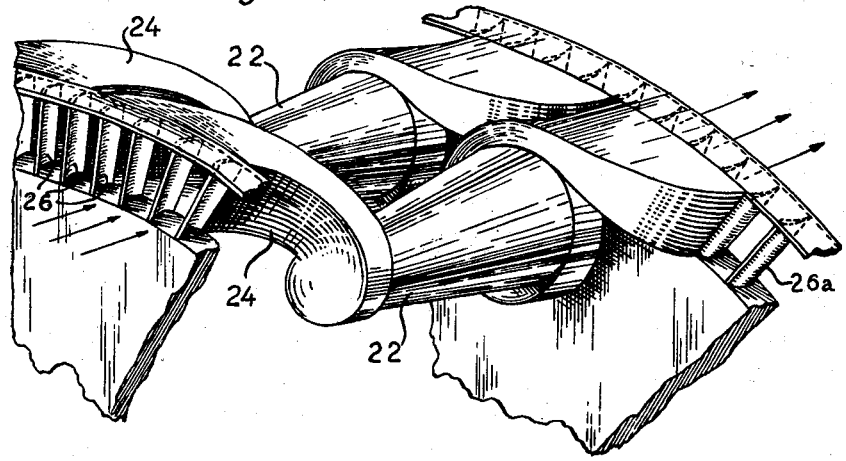
Figure 6a is a perspective view of two combustion chambers having the form illustrated in Figures 5 and 6.

It is to be understood that the mixing chamber according to the invention can be used for a mixing of any number of different media, the gaseous, liquid or pulverulent form. It is also intended to be used for reacting together different media, and in particular for combustion purposes, as described hereunder. Various uses of this mixing chamber with the broad aspect of reacting include such previously known uses of mixing chambers as chemical reactions, heating and/or drying or cooling of materials, moistening of materials and producing inert gases, among other things.

As shown in Figures 1 to 3, an exemplary mixing chamber according to the invention is constituted by a simple tubular revolution casing 1. An inlet 2 and an outlet 3 are provided at respective ends 50 and 52 of tubular casing 1. In this example, tubular casing 1 has a frusto-conical shape, inlet 2 being disposed at its small end 50.

According to the invention, inlet 2 is disposed, or combined with suitable means, in such a manner that the incoming medium (which, for example, may be a combustive fluid, when the chamber is used for combustion purposes) is projected tangentially into casing 1, as shown at 4, the flow thus produced always remaining in contact with the wall of casing 1 along which it progresses while rotating (spiralling) around the axis of said casing. This spiralling progression results in a pressure distribution in the fluid in the tubular casing which enables counterflowing coaxial, annular zones of fluid, Figure 1.

A terminal rigid obstacle, which, as shown in Figures 1 and 2 is constituted by end wall 5 of outlet 3, can be disposed transversely at the outlet end of the frusto-conical casing 1.

Figure 2 shows a pressure distribution diagram plotted on a cross-section outline of the frusto-conical chamber 1. One of the pressure distribution curves A, plotted on a base line indicated by heavy line X adjacent the small end 50 of the chamber 1, represents the pressure distribution of the fluid at a section diametrically across the small end 50 of the frustoconical tube where the spiral fluid flow is introduced. For ease in explanation, the value of base line X is plotted as $p_0$, the mean pressure of the fluid within the chamber.

The other pressure distribution curve B plotted on a base line indicated by heavy line X' adjacent the large end 52 of chamber 1, represents the pressure distribution of the fluid at a section diametrically across the large end 52 of the frusto-conical chamber 1. Here also the value of base line X' is plotted as $p_0$, the mean pressure in the chamber. Therefore the base lines X and X' represent an identical pressure value, the mean pressure $p_0$ within the chamber. These two curves A and B are plotted at different locations on the drawing figure to avoid overlap which might be confusing.

The pressure value scales of both curves A and B extend horizontally and are divided into increments of equal values of pressures. No exact pressure values are indicated because these curves are intended to represent differences in magnitude of the pressures at various locations in the chamber and magnitude can be shown without designating exact values to the pressure scale. Mean chamber pressure $p_0$ is used as a base line because it is a handy common reference pressure from which to plot distribution curves of pressures at any point in the chamber.

Referring now to curve A, the pressure distribution of inlet fluid, it will be seen that a very high pressure exists adjacent the tubular chamber wall (indicated by points $a$ and $b$ on the chamber wall and by $a'$ and $b'$ on curve A) and a very low pressure exists at the axis Y of the chamber 1 (at the inlet point indicated by $c$ on the axis Y and by $c'$ on the curve A). This is a very sharp pressure gradient as represented by the deep bucket of curve A and means a very large decrease of pressure, from the wall to the axis, exists at the inlet end 50.

Referring now to curve B, the pressure distribution of fluid at the large end 52 of chamber 1, it is seen that the pressure adjacent the tubular chamber wall (indicated by points $d$ and $e$ on the chamber walls and by $d'$ and $e'$ on curve B) is still higher than the mean pressure $p_0$, but lower than the pressure $a'$ adjacent the wall at inlet end 50. The pressure at the axis Y of the chamber 1 (at the point indicated as $f$ on axis Y and $f'$ on curve B) is lower than the mean pressure $p_0$ but not as low as pressure $c'$ at the center of axis of the section at inlet end 50. This pressure gradient is flatter than the gradient at the inlet end 50, although it still represents a decrease in pressure from the wall to the axis at the large end 52.

Fluid flows from a high pressure zone to a low pressure zone hence the incoming fluid which is under a very high pressure $a'$ and $b'$ in the annular zone adjacent the chamber wall at inlet end 50, if it can be prevented from flowing inwardly to point $c$ (a very low pressure), will flow along the chamber wall toward the end 52 where the pressure $d'$ and $e'$ is lower than pressure $a'$ and $b'$. Near the end 52 of chamber 1, as will be hereinafter explained, fluid tends to flow inwardly from the high pressure $d'$ and $e'$ of outer zone to the lower pressure $f'$ at the inner zone along axis Y. Fluid at the inner zone of large end 52 along axis Y is under a pressure $f'$ which is higher than pressure $c'$ at the axis of the inlet end 50, hence an inner zone or core of fluid flow will occur from end 52 to inlet end 50.

Such a pressure pattern within the tubular chamber 1 as has been described, can result in counterflowing outer and inner zones of fluid.

The manner in which this pressure pattern and the desired flow paths are provided will now be described. As was previously described with reference to the embodiment of Figures 1, 2 and 3, fluid 4 is introduced through inlet 2 in a direction tangential to the tubular wall of chamber 1 and introduction generates a high speed spiral flow along the wall of chamber 1. The spiral flow generated along the outer wall of the frusto-conical mixing chamber by the inlet means 2 can be assumed, as a first approximation, to be a potential vortex governed by the law of conservation of angular momentum.

Neglecting boundary layer friction along the wall of the chamber at the present, the following equation for constant angular momentum of the flow in the chamber will govern:

$$M = r u_t$$

where:

M—angular momentum
r—radius of the chamber
$u_t$—tangential component of the velocity of flow Since the angular momentum (neglecting friction) must be constant, the tangential velocity of fluid at the inlet end 50 of the chamber will be greater than its tangential velocity at the other end 52 because, in a frusto-conical tube, $r$ increases from the small end to the large end.

The static pressure at any point in the chamber is determined by Bernoulli's law:

$$p \tfrac{1}{2} d u^2 = \text{a constant}$$

where:

p—static pressure in the chamber
d—density of the medium
u—velocity of the flow

Since the sum of the factors of the equation must be constant, $p$ must be lower in a zone of high velocity and higher in a zone of low velocity. At the small inlet end of the chamber, where the velocity of the flow is high, the static pressure will be lower than at the large end of the chamber where the velocity is lower. Because the spiral flow is confined within tubular chamber wall the vortex theory suffers a modification. The low vortex theory pressure at the inlet end will occur in a central zone surrounded by an outer annular zone of very high pressure high speed fluid adjacent the confining tubular chamber wall which is developed because of centrifugal forces in the spiralling fluids being confined by the tubular walls against outward movement. This outer zone of fluid under centrifugally developed pressure cannot return toward the low pressure zone at inlet end 50 against the centrifugal forces so the fluid in the outer annular zone progresses along the chamber wall to the large end 50. Near the large end because of the progressive decrease in velocity of the fluid, centrifugal forces in the spiralling fluid can no longer keep the outer zone under a high pressure against the wall of the tubular chamber and because the vortex pressure has increased, the pressure distribution becomes flatter as noted by curve B (Figure 2) and an inflow of fluid to the center of large end 52 will result.

Thus it can be seen that the central zone pressure at the small inlet end is lower than the central zone pressure at the large end and flow of the fluid will take place from the large end to the small end, in an inner zone along the axis of the chamber.

As shown in Figures 1 and 3, a nozzle 6 feeds the chamber with a second medium which, in the case of a combustion chamber, is a combustible medium, said feeding preferably taking place, as shown, near the axis of the chamber in the direction of said counterflow. The ideal location, particularly in the mixing of spontaneously combustible, oxidizers, and fuels, is to introduce the additional fluid (e.g., the oxidizer) in the inner zone at the high pressure end of that zone, because particles of that fluid could then be drawn into and mixed within the turbulent intermediate zone, throughout its entire length. The additional fluid (for example, gasoline) could, of course, be introduced with the aforenoted first fluid (for example, air) in which case it becomes part of the first fluid.

The interaction between the flow 4 of the first medium and the counterflow 7 gives rise to an annular zone of intense continuously violent S–L type of turbulence between the inner and outer zones of counterflowing fluid. This turbulence occurs between the high speed inner and outer zones and creates a neutral speed zone, in effect a floating or stationary (suspended) zone of turbulence in which mixing of the turbulent fluid is thorough and, excepting for outer and innermost zones, can fill up the interior space of the mixing chamber. Since additional fluid is being continuously fed through the inlet 2 and thence by means of the counterflowing streams into the turbulent zone, the thoroughly mixed fluid in the turbulent zone must have an exit. In the embodiment of Figures 1–2 the outlet is provided at the large end of the frusto-conical tube and outgoing fluid is directed by the confining end wall 5 into the outlet duct 3. Outlet 3 is constituted by a spiral duct extending tangentially to the wall of casing 1 and essentially parallel to the end wall 5.

A similar pressure pattern to that shown by Figure 2 can be created in a cylindrical tube, for example the chamber 27 in Figure 7 but since the walls are not frusto-conical the differences between inlet pressure distribution pattern and the outlet pattern are not as great. Nevertheless similar principles apply. The centrifugal forces in the spiralling flow from the inlet end of the tube to the outer end will create a sharp pressure gradient with high pressure in an outer annular zone and very low pressure in an inner zone. This pressure pattern will be flatter at the other end because boundary layer friction of the fluid passing along the tubular wall will decrease the spiral flow velocity and pressures due to centrifugal forces of the spiralling fluid will drop, permitting a more even pressure distribution at the end opposite the inlet end. The flatter pressure distribution provides a higher axial pressure than at the inlet end and results in flow along an inner axial zone to the inlet end. Thus, the counterflowing inner and outer annular zones of high speed fluid flow is produced in a cylinder and the intermediate annular floating zone of S–L type violent continuous turbulence occurs. In a combustion chamber the result is continuous mixing in practically the entire chamber which will result in complete mixture of the combustive and combustible media. Thus a coherently burning flame practically fills the whole volume of the chamber and enables a maximum "combustion load" to be attained and maintained. "Combustion load" is intended to mean the number of calories developed per unit volume, per unit time at sea level pressure.

In a combustion chamber, the rotating outer zone of relatively cool high speed fluid insulates the outer wall against heat and absorbs and removes radiation heat caused by the burning gases, thus providing a double cooling effect. No mixing of combustive and combustibles occurs within the high speed outer zone and burning cannot there take place.

A combustion chamber according to the invention, in spite of its capability of maintaining enormous "combustion loads" and, hence, the huge amount of heat which can be developed, has its outer wall kept at temperatures sufficiently low to constitute no risk or heat damage to surrounding parts and to limit the thermal losses to a negligible value, even without any heat insulation or use of special heat resisting alloys as need frequently be used in previously known combustion chambers.

If the combustion chamber is of annular shape having an inner coaxial tubular wall, the inner counterflowing zone of fluid provides somewhat similar, although lesser protective cooling for the inner tubular wall as that which the outer zone provides for the outer wall.

In Figure 4 is shown a turbo jet engine constituted by a plurality of compressor stages comprising a rotor 9 with rotating blades 10, a stator with stationary blades 11 and one or more turbine stages comprising a rotor 12 with rotating blades 13 and stationary blades 14. Between the compressor and the turbine is disposed a combustion chamber according to the invention, which in this example, is constituted by a tubular annular casing 15 which provides an axial passage through which is accommodated a shaft 16 to ensure driving of compressor rotor 9 from the turbine rotor 12. The annular inlet 17 of the combustion chamber is fed with a substantially helical (spiral) flow of compressed air from the last row of blades of rotor 9 of the compressor, while the annular outlet 18 of the combustion chamber feeds the first row of blades 13 of the rotor 12 of the turbine. A suitable combustible medium is fed near the axis of the chamber, as shown at 19, in the direction of the counterflow, to be mixed thoroughly with the combustion supporting flow of air.

A particular feature of this embodiment is that the output flow of burned gases from outlet 18 is deprived of its rotation component derived from the spiralling of the input air in the outer annular zone by the turbine rotor 12, so that, as shown at 20, the gases are expelled in the shape of a substantially rectilinear jet, while said rotation component is used in driving the compressor rotor 9. The compressor is fed as usual with air from outside through a forwardly directed intake, as shown at 21.

In a second embodiment shown in Figures 5, 6 and 6a, a plurality of combustion chambers 22 constructed according to the invention, are distributed around the periphery of a gas turbine engine between the compressor and the turbine. Each of chambers 22 is constructed with the aforedescribed frustoconical tubular wall with the small end of the combustion chambers facing the compressor. In this embodiment, all chambers 22 are fed simultaneously with compressed air from the compressor, and they are fed axially in the direction of flow of the inner zone of counterflowing fluid with a combustible fuel by means of individual nozzles 23 from a common source of fuel. In this embodiment, the inlet portion of each chamber has been given a special shape, as shown at 24, Figure 6a in order to ensure the formation of the required input flow.

In the forms of the invention illustrated in Figure 4 or in Figures 5, 6 and 6a, the inlets and/or outlets of the combustion chambers may be provided, if required, with guide vanes as shown at 25 in Figure 4 and at 26 and 26a in Figures 5, 6 and 6a.

Figure 7B:
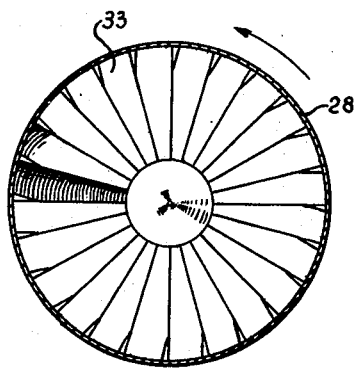
Figure 7A:
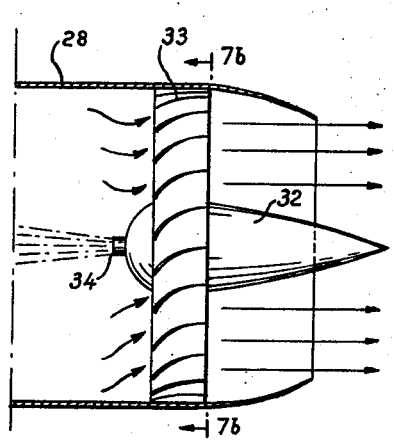
Figure 7a is an enlarged sectional view of the straightener vanes illustrated in Figure 7.

In a ram jet embodiment shown in Figures 7, 7a and 7b, a cylindrical combustion chamber 27 according to the invention has been mounted in the rear portion of a tubular shell 28, in the front portion of which is fixedly secured a streamlined core 29. A diverging annular passage 30 is thus formed between core 29 and the tubular shell 28 and constitutes a subsonic diffusing inlet. It is to be understood that, in accord with known principles, in a ram jet designed for supersonic operation a diffusing inlet will converge rather than diverge. At its inner end, the core 29 is fixedly secured on a transverse partition provided with a set of guide vanes 31, the inclination and shape of which is such as to impart a tangential component to the axial annular flow of air fed through the diverging passage 30. The fuel is furnished through a small streamlined container 32 implanted in a rear transversal partition 33 which is also provided if desired with an annular set of guide vanes 33, the function of which is to convert the helical gas flow leaving chamber 27 into a substantially axial flow, as indicated by the arrows in Figure 7a. The front wall of container 32 constitutes a rigid obstacle and its outlet nozzle 34 feeds the fuel axially in the direction of said counterflow in chamber 27. The guide vanes 31 and 33 moreover impart the engine, when the same is used as a self-propelled projectile, with a swift whirling motion providing directional stability and facilitating its penetration into air.

Finally, in Figures 8 and 9 is shown a blade of a helicopter which is provided with a combustion chamber according to the invention. Said combustion chamber shown at 35 is mounted at the tip of the blade 37 with its outlet ejecting burnt gases in a direction substantially at a right angle to the trailing edge 36 of said blade, as shown at 38.

In this embodiment, all individual combustion chambers are fed through suitable ducts 39 with compressed air, while suitable ducts 40 ensure their feeding with fuel.

It is to be understood that the requisite counterflowing streams of fluid within the mixing chamber can be attained in a chamber with a cylindrical or a frusto-conical outer wall and either type can be utilized in lieu of the other in the various embodiments herein disclosed. Also as clearly shown in the drawing figures the length of the mixing tube must be greater than the maximum diameter of the effective area of cross section of the mixing chamber space. Furthermore it is understood that in the disclosed combustion chambers, combustion can be initiated by any of the many known ways, i.e., with proper fluid fuel and fluid oxidizers, spontaneous combustion is relied upon and, when air and a hydrocarbon are utilized, one of the many known types of igniters will be used.

The foregoing description discloses a method of obtaining a type of mixing turbulence, designated S-L turbulence (Schlichting-Lessen), which is different from the previously attained turbulent flow utilized in previously known mixing chambers. The method attains turbulent flow characteristics from counterflowing paths of fluid and the characteristics of the turbulence remain essentially constant from Reynolds numbers of the developing fluid much lower than was realized in previous mixing chambers up to a Reynolds number value of infinity. Several structural embodiments of mixing chambers, including mixing combustion chambers are disclosed for utilizing the aforenoted method of mixing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A ram-jet comprising: a tubular combustion chamber, inlet means to feed said chamber at one end with a combustive medium in a continuous flow rotating and progressing along the outer wall of said chamber to its other end, to thereby create at said inlet end a large negative gradient of pressure from the outer wall of said chamber to its axis, said wall creating in the fluid flow section of said other end a negative gradient distribution of pressure lesser and more uniform than the pressure gradient at said inlet end, whereby a substantially axial counterflow is created from said other end toward said inlet end, while a continuously moving tubular turbulent combustive-combustible mixing zone is created by the interaction between said flow and counterflow, said chamber wall extending in a forward direction from its inlet end to form a tubular shell, an aerodynamic core rigidly mounted in the forward part of said tubular shell protruding therefrom and forming therewith an annular diffusor passage, annular blading means extending substantially transverse to the axis of the chamber at the rear of said shell portion of said chamber, rigid with said shell and forming said inlet means to said chamber, means to continuously feed said chamber with a combustible medium, expansion nozzle outlet means to let burnt gases escape from said chamber, and said means to feed a combustible medium to said chamber including a streamlined fuel container secured adjacent the outlet end and approximate the axis of said chamber.

2. A tubular frusto-conical fluid mixing chamber in which an annular turbulent zone of fluid is provided between two concentric zones of counterflowing fluid streams within the frusto-conical chamber, comprising a frusto-conical tube; inlet structure means adjacent the small diameter end of said frusto-conical tube to introduce a fluid into said tube in a manner causing spiraling of the fluid at said small diameter end; said inlet structure means, and the diverging walls of said frusto-conical tube constituting means to cause the fluid to progress from the small diameter end to the large diameter end of said tube in a spiral tubular path, defined by the tubular walls, to create pressure patterns within said tube providing an inflow of fluid at the large diameter end of said tube chamber and a reversal of fluid flow along the axial core of said tube from said large diameter end to a position adjacent said small diameter end.

3. A tubular substantially cylindrical fluid mixing chamber in which an annular turbulent zone of fluid is provided between two concentric zones of counterflowing fluid streams within the chamber, comprising a substantially cylindrical tube, one end of which is no greater in diameter than the other end; inlet structure means adjacent the said one end of said tube to introduce a fluid into said tube in a manner causing spiraling of the fluid at said one end; said inlet structure means, and the wall of said tube between said one end and said other end constituting means to cause the fluid to progress from said one end to the other end of said tube in a spiral tubular path, defined by the tubular wall, to create pressure patterns within said tube providing an inflow of fluid at said other end of said tube, and a reversal of fluid flow along the axial core of said tube from said other end to a position adjacent said other end.

4. A mixing chamber of frusto-conical shape having an open inlet end for the entrance of fluid at the small diameter end of the chamber and an open outlet end for the exit of fluid at the large diameter end of the chamber, said chamber having a smooth interior wall between its ends for unobstructed passage of fluid through the mixing chamber, and having an axial length greater than the largest diameter of the chamber; fluid feed means adjacent the inlet end of said mixing chamber having a circular outlet orifice of about the same diameter as the inlet end of the mixing chamber and disposed to impart tangential and axial velocity components to a fluid fed into the mixing chamber; outlet means adjacent the outlet end of said mixing chamber to receive fluid exiting from the mixing chamber and having a circular opening for entrance of fluid of about the same diameter as the outlet end of said mixing chamber; and a second orifice near the outlet end of said mixing chamber disposed to introduce fluid approximate the axis of the chamber and directed toward the inlet end.

5. A tubular mixing chamber of circular cross section having an open inlet end for the entrance of fluid and an open outlet end for the exit of fluid and having an interior wall of smooth uninterrupted surface from inlet end to outlet end, for unobstructed passage of fluid through the mixing chamber and having an axial length greater than the largest cross sectional diameter of the chamber; fluid feed means adjacent the inlet end of said mixing chamber, disposed to impart tangential and axial velocity components to the fluid fed into the mixing chamber; outlet means adjacent the outlet end of said mixing chamber to receive fluid exiting from the mixing chamber and having a circular opening, for entrance of fluid thereinto, of about the same diameter as the outlet end of said mixing chamber; and a second feed means disposed near the outlet end of said mixing chamber to introduce fluid approximate the axis of the chamber and directed toward said chamber inlet end.

6. A mixing chamber as defined in claim 5, with a frusto-conical shape, wherein said inlet end is the end of the chamber having the smallest diameter and the outlet end is the end of the chamber having the largest diameter.

7. A mixing chamber having a tubular wall with two ends, comprising means to feed said chamber at one end with a first fluid in a direction such that said fluid flows along the wall of said chamber with tangential and axial velocity components toward the other end of said chamber to thereby create at said one end a sharp, decreasing pressure gradient from said wall to the elongate axis of the chamber, said wall constituting means to establish in said fluid flow across the section of said other end a similarly decreasing but flatter distribution of pressure than at said one end, to cause a self-induced reversal of the flow of said fluid inwardly into a substantially axial counterflow extending from said other end to said one end, so that a tubular turbulent mixing zone is created by the interaction between said flow and said counterflow, means to feed said chamber with at least a second fluid to be mixed with said first fluid, and means adjacent said other end to discharge the mixture of said fluids obtained in said chamber.

8. A mixing chamber according to claim 7, in which said discharge means is constituted by a transverse solid wall, and a duct extending substantially tangentially to the periphery of the chamber and to said wall in the direction of tangential velocity component.

9. A mixing chamber according to claim 7, in which said discharge means is constituted by a central wall extending transversely at said other end, and an annular space between the periphery of said central wall and the tubular wall of said chamber, including a set of straightening vanes to direct the discharging fluid parallel to the axis of the chamber.

10. A ram-jet comprising a tubular combustion chamber according to the chamber defined in claim 7; the walls of said chamber extending forwardly from its inlet end to form a tubular shell; an aerodynamic core rigidly mounted in the forward part of said tubular shell protruding therefrom and forming therewith an annular diffusor passage; annular blading means extending substantially transversely of the axis of the chamber and disposed rigid with the tubular wall at the rear of said shell portion and forming said means to feed fluid into said one end of said chamber, which in a ram-jet is the air inlet to said chamber; a streamlined fuel container secured adjacent the outlet end and approximate the axis of said chamber, said container being adapted to continuously inject fuel into said chamber during a predetermined time; and said outlet end constituting an expansion nozzle.

11. A turbo-jet engine comprising, in combination, a combustion chamber according to the chamber defined in claim 7 provided with an annular inlet and an annular outlet, a compressor stage upstream of said chamber in the immediate vicinity of said annular inlet, a turbine stage downstream of said chamber in the immediate vicinity of said annular outlet, a driving shaft connecting said turbine stage with said compressor stage, and an outlet nozzle downstream of said turbine stage.

12. The method of creating fluid turbulence between counterflowing, distinct adjacent fluid streams for mixing purposes in a tubular chamber of circular cross section having an inlet end and an outlet end, comprising: the step of forcing at least one fluid to flow along a spiral path of non-diminishing cross sectional diameter in contact with the inner side of the tubular wall of said chamber from the inlet end to the outlet end with tangential and axial-velocity components; the step of creating along the axis of said chamber a decrease in static pressure from the outlet end to the inlet end; and the step of creating along the axis of said chamber a flow of fluid within the spiral path with an axial velocity opposite in direction to the axial velocity component of such spiral flow, the two opposed flow streams having sufficient length of adjacent opposite travel so that such length is greater than the thickness dimension across both streams to provide a definite elongate intermediate zone of substantially the same length as the opposed inner and outer flows; the relative velocity of the two opposing axial flows being such that the Reynolds number determined by said relative velocity is at least equal to the critical Reynolds number of the fluid or S–L type of turbulence and an elongate tubular zone of turbulence is created at the boundary between the two flows.

13. The method of creating fluid turbulence for mixing purposes in a tubular chamber of circular cross section as defined in claim 12, comprising the additional step of introducing a stream of second fluid into the flowing fluid.

14. A method as defined in claim 13, wherein the stream of second fluid is introduced axially within the inner axial zone of flowing fluid and in the same direction as the flow of the inner distinct flow stream of fluid.

15. A method of bringing about turbulence comprising: the steps of producing two distinct and adjacent fluid flow paths flowing in substantially opposite directions with a relative velocity being such that the Reynolds number determined by said relative velocity is at least equal to the critical Reynolds number of the fluid for S–L type of turbulence, and maintaining said paths within a confined adjacent relationship for a predetermined dimension materially greater than the combined thickness dimension through the two adjacent flow paths to create an elongate zone of highly violent turbulence substantially equal to said predetermined dimension suspended between said two flow paths.

16. The method of bringing about a relatively stationary annular elongate zone of violent turbulent mixing comprising: developing and maintaining within a confined elonagte tubular path, the length of which is at least one and one-half times its mean diameter, two concentric, elongate counterflowing fluid streams having circular cross section normal to the elongate axis, both of which have distinct adjacent flow paths etxending substantially the elongate extent of the entire mixing zone and the relative velocity of said two flow paths being such that the Reynolds number determined by said relative velocity is at least equal to the critical Reynolds number of the fluid for S–L type of turbulence.

17. A method of creating a turbulent zone of fluid between two concentric distinctly separate fluid flow streams comprising: creating a spiral fluid flow; confining the spiral flow to a fixed divergent tubular path of sufficient length so that at a distance down the path a reversal occurs in the form of an inflow becoming a counterflow of the fluid along the axis on the inner side of the spiral outer flow; the said distance to the reversal being at least one and one-half times the mean diameter of said tubular path and the counterflow stream also having a length substantially equal to said distance; and the relative velocity between the outer flow and the counterflow being at least equal to a value representing the critical Reynolds number of the fluid for S–L type of turbulence.

References Cited in the file of this patent

UNITED STATES PATENTS

| | | |
|---|---|---|
| 1,493,753 | Koleroff | May 13, 1924 |
| 1,657,698 | Schutz | Jan. 31, 1928 |
| 1,762,762 | Coffey | June 10, 1930 |
| 2,097,255 | Saha | Oct. 26, 1937 |
| 2,164,225 | Walker | June 27, 1939 |
| 2,326,072 | Seippel | Aug. 3, 1943 |
| 2,500,925 | Bonvillian et al. | Mar. 21, 1950 |
| 2,503,006 | Stalker | Apr. 4, 1950 |
| 2,520,967 | Schmitt | Sept. 5, 1950 |
| 2,577,918 | Rowe | Dec. 11, 1951 |
| 2,605,608 | Barclay | Aug. 5, 1952 |
| 2,648,492 | Stalker | Aug. 11, 1953 |
| 2,648,950 | Miller | Aug. 18, 1953 |
| 2,696,076 | Weeks | Dec. 7, 1954 |
| 2,701,608 | Johnson | Feb. 8, 1955 |
| 2,745,250 | Johnson et al. | May 15, 1956 |

FOREIGN PATENTS

| | | |
|---|---|---|
| 756,313 | Germany | May 23, 1952 |

UNITED STATES PATENT OFFICE

CERTIFICATE OF CORRECTION

Patent No. 2,935,840

May 10, 1960

Fritz Schoppe

It is hereby certified that error appears in the printed specification of the above numbered patent requiring correction and that the said Letters Patent should read as corrected below.

Column 1, line 11, for "appartus" read -- apparatus --; line 64, for "accomplished" read -- accomplishes --; column 4, line 72, for "frustoconical" read -- frusto-conical --; column 12, line 1, for "fluid or" read -- fluid for --; line 29, for "elonagte" read -- elongate --; line 33, for "etxending" read -- extending --.

Signed and sealed this 18th day of October 1960.

(SEAL)
Attest:

KARL H. AXLINE
Attesting Officer

ROBERT C. WATSON
Commissioner of Patents